United States Patent
Masterson et al.

(10) Patent No.: US 7,115,064 B2
(45) Date of Patent: Oct. 3, 2006

(54) METHOD FOR CONTROLLING A HYBRID VEHICLE

(75) Inventors: Brandon Masterson, Whitmore, MI (US); Dan Colvin, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 247 days.

(21) Appl. No.: 10/711,223

(22) Filed: Sep. 2, 2004

(65) Prior Publication Data

US 2005/0054479 A1 Mar. 10, 2005

Related U.S. Application Data

(60) Provisional application No. 60/501,766, filed on Sep. 10, 2003.

(51) Int. Cl.
*B60K 1/02* (2006.01)
*B60W 10/04* (2006.01)

(52) U.S. Cl. .......................................... 477/3; 477/115
(58) Field of Classification Search .................... 477/3, 477/115; 180/65.3, 65.4; 903/942, 945
See application file for complete search history.

(56) References Cited

U.S. PATENT DOCUMENTS

| | | | |
|---|---|---|---|
| 5,653,659 A | 8/1997 | Kunibe et al. | |
| 5,873,426 A * | 2/1999 | Tabata et al. | 903/903 |
| 5,887,670 A | 3/1999 | Tabata et al. | |
| 5,982,045 A | 11/1999 | Tabata et al. | |
| 6,077,186 A * | 6/2000 | Kojima et al. | 477/3 |
| 6,081,042 A | 6/2000 | Tabata et al. | |
| 6,176,808 B1 | 1/2001 | Brown et al. | |
| 6,327,852 B1 * | 12/2001 | Hirose | 180/65.4 |
| 6,494,809 B1 | 12/2002 | Suzuki et al. | |
| 2003/0034188 A1 * | 2/2003 | Gotou | 180/65.2 |
| 2003/0130772 A1 * | 7/2003 | Yanagida et al. | 180/65.1 |
| 2004/0259680 A1 * | 12/2004 | Ozeki et al. | 477/3 |

* cited by examiner

*Primary Examiner*—Roger Pang
(74) *Attorney, Agent, or Firm*—Davis B. Kelley; Brooks & Kushman

(57) ABSTRACT

A method for controlling a wheel drive system of a hybrid electric vehicle when starting a power source. The hybrid electric vehicle includes first and second power sources, a motor, and a power transfer unit adapted to drive a vehicle wheel. The method includes determining whether the first power source is to be started, determining whether a level of torque requested by a vehicle operator is greater than a threshold value, maintaining a current gear ratio if the threshold value is exceeded, and providing a target level of torque to the power transfer unit.

20 Claims, 2 Drawing Sheets

METHOD FOR CONTROLLING A HYBRID VEHICLE

CROSS-REFERENCE TO RELATED APPLICATIONS

This application claims the benefit of U.S. provisional application Ser. No. 60/501,766 filed Sep. 10, 2003.

BACKGROUND OF THE INVENTION

1. Field of the Invention

The present invention relates generally to the control of a hybrid electric vehicle, and more particularly to a method for controlling a wheel drive system of a hybrid electric vehicle.

2. Background Art

Previously, hybrid electric vehicles employed control strategies that restricted "shift-up" actions of an automatic transmission to reduce shifting shocks that occurred as power source output decreased. An example of such a control strategy is described in U.S. Pat. No. 5,982,045. However, these hybrid vehicle control strategies did not address the problems associated with executing a transmission downshift to a lower gear ratio while simultaneously starting a drive power source, such as an engine of the hybrid electric vehicle.

SUMMARY OF THE INVENTION

According to one aspect of the present invention, a method for controlling a wheel drive system of a hybrid electric vehicle when starting a power source is provided. The hybrid electric vehicle includes first and second power sources, a motor, and a power transfer unit. The motor is configured to be driven by the first and/or second power sources. The power transfer unit has a plurality of gear ratios and is adapted to be driven by the motor to drive a vehicle wheel.

The method includes determining whether the first power source is to be started, determining whether a level of torque requested by a vehicle operator is greater than a threshold value, maintaining a current gear ratio if the level of torque requested by the vehicle operator is greater than the threshold value, and providing a target level of torque with the motor while the current gear ratio is engaged. The method inhibits gear backlashes that may occur when a transmission downshift is executed when a power source is being started. Moreover, the method inhibits the undesirable noises and component life degradation that results from a gear backlash.

The level of torque requested by the vehicle operator may be based on a signal from an accelerator pedal position sensor. The step of determining whether the level of torque requested by the vehicle operator is greater than the threshold value may also include determining whether the level of torque requested by the vehicle operator is less than an upper limit value. The threshold value may be based on the current gear ratio of the power transfer unit.

The first power source may be an internal combustion engine. The second power source may be a battery. The motor may be a starter-alternator.

According to another aspect of the present invention, a method for controlling a wheel drive system of a hybrid electric vehicle during a rolling start is provided. The hybrid electric vehicle includes first and second power sources, a motor, and a power transfer unit. The motor is configured to be driven by at least one power source. The power transfer unit has a plurality of gear ratios and is adapted to be driven by the motor to drive a vehicle wheel.

The method includes the steps of determining whether to start the first power source, determining whether a level of torque requested by a vehicle operator is greater than a threshold value indicative of a level at which a power transfer unit gear ratio downshift would be desired, inhibiting a downshift to a lower gear ratio for a predetermined period of time, and providing an additional amount of torque to the vehicle wheel with the motor and second power source while the downshift to the lower gear ratio is inhibited. The method inhibits gear backlashing and improves vehicle driveability by inhibiting backlash events and associated noises and changes in wheel torque during the predetermined period of time in which a gear backlash may be likely to occur.

The step of providing the additional amount of torque may include determining an amount of torque that would be available if a target gear ratio were engaged. The additional amount of torque may be the difference between an amount of torque provided in the current gear ratio and the amount of torque that would be provided if the target gear ratio was selected.

According to another aspect of the present invention, a method for controlling a wheel drive system of a hybrid electric vehicle during an engine start is provided. The hybrid electric vehicle includes an engine, a voltage source, a power transfer unit, and a motor-generator. The power transfer unit is adapted to drive a vehicle wheel and has a plurality of gear ratios. The motor-generator is selectively coupled to the engine via a first clutch, selectively coupled to the power transfer unit via a second clutch, and is adapted to be powered by at least one power source.

The method includes determining whether engine start-up is requested, determining whether a level of torque requested by a vehicle operator exceeds a threshold value associated with a current gear ratio, starting a timer, inhibiting a gear ratio shift of the power transfer unit, starting the engine, calculating an amount of torque to provide to the power transfer unit while in the current gear ratio, providing the amount of torque to the power transfer unit with the motor-generator while the engine is being started, and repeating the inhibiting, calculating, and providing steps until a predetermined period of time measured by the timer has elapsed.

The step of determining whether the level of torque requested by the vehicle operator exceeds the threshold value may include permitting a shift from the current gear ratio to a target gear ratio if the level of torque requested exceeds a limit value indicative of a wide open throttle condition.

The amount of torque to provide to the power transfer unit may be based on the current gear ratio, a target gear ratio that would be engaged if a gear ratio shift were permitted, and the level of torque requested by the vehicle operator.

The first clutch may be engaged while the engine is being started. The second clutch may be engaged after the engine has started.

DETAILED DESCRIPTION OF THE PREFERRED EMBODIMENT(S)

Figure 1:
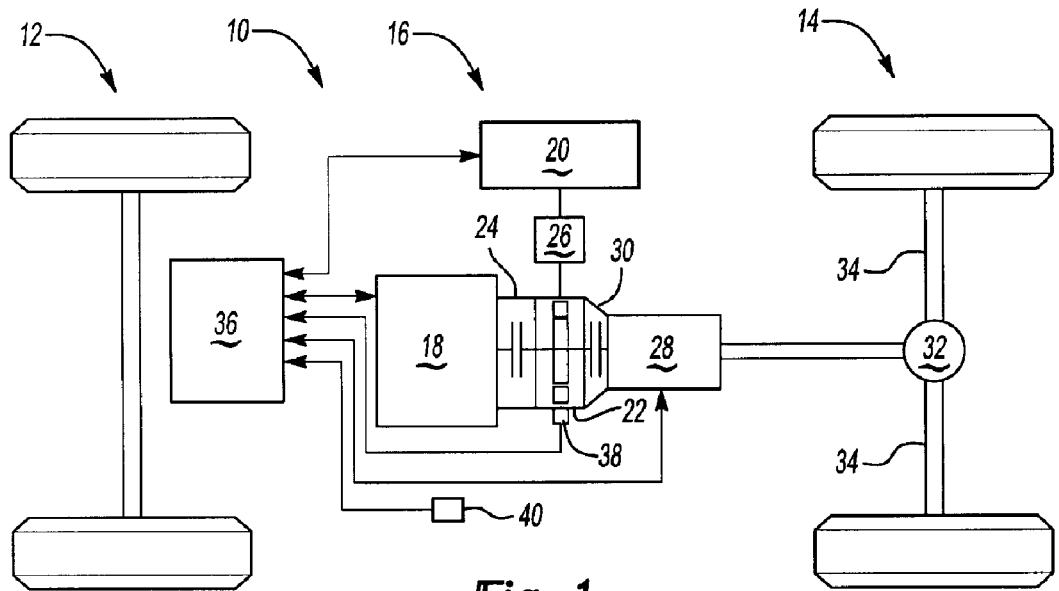
FIG. 1 shows a schematic of a hybrid electric vehicle.

Referring to FIG. 1, a schematic of a hybrid electric vehicle 10 is shown. The hybrid electric vehicle 10 includes a first wheel set 12, a second wheel set 14, and a drivetrain 16.

The wheel drive system or drivetrain 16 may be configured to drive or provide torque to the first and/or second wheel sets 12,14. The drivetrain 16 may have any suitable configuration, such as a parallel drive, series drive, or split hybrid drive as is known by those skilled in the art. In the embodiment shown in FIG. 1, a parallel drive configuration is shown.

The hybrid electric vehicle 10 may also include a plurality of power sources. In the embodiment shown in FIG. 1, the hybrid electric vehicle 10 includes a primary power source 18 and a secondary power source 20. However and suitable number of power sources may be employed.

The primary power source 18 may be any suitable energy generation device, such as an internal combustion engine or a fuel cell.

The secondary power source 20 may be any suitable voltage source, such as a battery, capacitor, or fuel cell. If a battery is used it may be of any suitable type, such as nickel-metal hydride (Ni-MH), nickel-iron (Ni—Fe), nickel-cadmium (Ni—Cd), lead acid, zinc bromine (Zn—Br), or lithium based. If a capacitor is used it may be of any suitable type, such as an ultra capacitor, super capacitor, electrochemical capacitor, or electronic double layer capacitor as is known by those skilled in the art.

The primary and secondary power sources 18,20 are adapted to provide power to the drivetrain 16. The primary power source 18 is selectively coupled to an electrical machine, such as a motor, motor-generator, or starter-alternator 22 via a first clutch 24. If the first clutch 24 is engaged, the primary power source 18 may propel the hybrid electric vehicle 10. If the first clutch 24 is disengaged, the secondary power source 20 may power the starter-alternator 22 to propel the hybrid electric vehicle 10. In addition, both the primary and secondary power sources 18,20 may simultaneously provide power to the starter-alternator 22.

An inverter 26 may be disposed between the secondary power source 20 and the starter-alternator 22. The inverter 26 converts direct current (DC) to alternating current (AC) when current flows from the secondary power source 20 and converts alternating current (AC) to direct current (DC) when current flows to the secondary power source 20.

The starter-alternator 22 may be selectively coupled to a power transfer unit 28 via a second clutch 30. The power transfer unit 28 may be of any suitable type, such as a multi-gear step ratio transmission or an electronic converterless transmission as is known by those skilled in the art.

The power transfer unit 28 is adapted to drive one or more vehicle wheels. More specifically, the power transfer unit 28 is connected to a differential 32 by a driveshaft. The differential 32 is connected to each wheel of the second wheel set 14 by a pair of halfshafts or axles 34.

Optionally, the hybrid electric vehicle 10 may be configured with one or more energy recovery devices, such as a regenerative braking system that captures kinetic energy when the brakes are applied and returns the recovered energy to the secondary power source 20 via the starter-alternator 22.

A vehicle system control module 36 may monitor and control various aspects of the hybrid electric vehicle 10. For example, the control module 36 may be connected to the primary power source 18 and power transfer unit 28 to monitor and control their operation and performance. In addition, the control module 36 may receive input signals from various components. These components may include a motor speed sensor 38 and an accelerator pedal position sensor 40. The motor speed sensor 38 detects the rotational velocity of the starter-alternator 22. The accelerator pedal position sensor 40 detects the driver's commands for acceleration of the hybrid electric vehicle 10.

In a hybrid electric vehicle such as that previously described, it is undesirable to simultaneously start the primary power source or engine and execute a power transfer unit gear ratio shift while the vehicle is in motion, also known as a "rolling start", for three main reasons.

First, if the gear ratio is changed while the engine is being started, the gears of the differential and/or power transfer unit may backlash. More specifically, a gear backlash condition may occur when the gear torque switches between a positive torque (in which the vehicle wheels are driven by the drivetrain) and a negative torque (in which the compression braking effect of the engine provides a retarding torque). Gear backlash may be perceived by vehicle occupants as an undesirable bump or clunk and may reduce component life.

Second, the configuration of the hybrid vehicle drivetrain may create physical limitations that prohibit a gear ratio shifts while starting the engine. For example, vehicle control logic may attempt to engage and disengage a particular clutch at the same time.

Third, a secondary power source or the starter-alternator may run out of capacity to provide the desired level of torque to the power transfer unit when a gear ratio shift and engine start coincide. As a result, a vehicle occupant may perceive a lack of acceleration or vehicle responsiveness. Consequently, it may be desirable to provide additional torque with the starter-alternator to adequately respond to a driver's acceleration commands.

Figure 2:
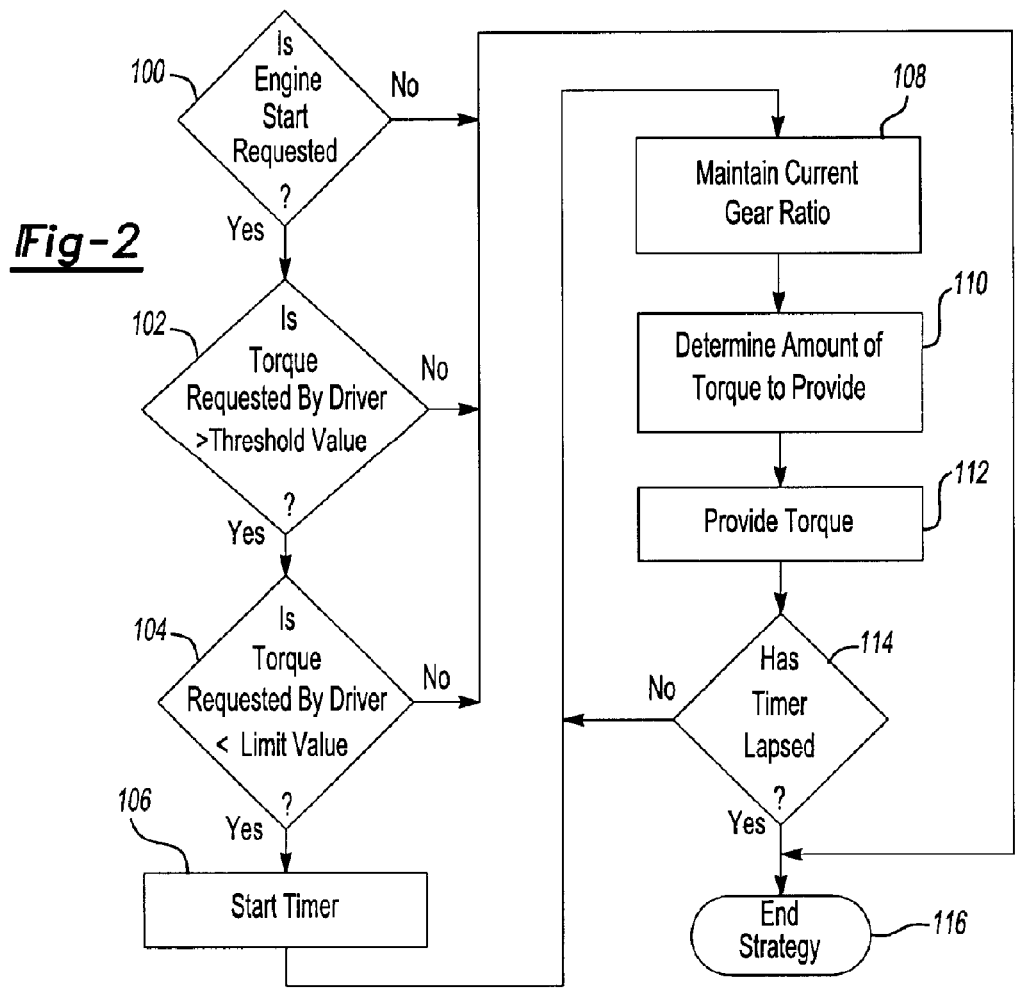
FIG. 2 is a flowchart of a method for controlling a wheel drive system of the hybrid electric vehicle.

Referring to FIG. 2, a flowchart of a method for controlling the wheel drive system of the hybrid electric vehicle 10 is shown. The method may inhibit power transfer unit gear ratio shifts when the primary power source is being started and may provide additional torque to the power transfer unit and vehicle wheels.

As will be appreciated by one of ordinary skill in the art, the flowchart represents control logic which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing is employed in real-time control applications, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

In this flowchart, the term "engine start" denotes activation of the primary power source. However, the present invention contemplates that the primary power source may not be an engine as previously discussed.

At 100, the method begins by determining whether engine start-up is desired. This determination may be based on an engine start-up signal provided to or by the control unit. An engine start-up signal may occur in many situations, such as when the secondary power source has a low charge or when more power is demanded by the driver than the secondary power source can provide. If engine start-up is not requested, the process continues at block 116 where the strategy is discontinued. If engine start-up is requested, the process continues a block 102.

At 102, the method determines whether the torque requested by the driver is greater than a threshold value. The torque requested by the driver may be based on a signal from the accelerator pedal position sensor. This signal may be converted into a torque value in a manner known by those skilled in the art. The threshold value may be based on the current gear ratio of the power transfer unit. More specifically, a threshold value may be associated with each gear ratio. These threshold values may be stored in a lookup table for access by the control unit. The threshold values may be established by vehicle calibration testing and the associated shift schedules of the power transfer unit. If the torque requested by the driver is not greater than a threshold value, the process ends at block 116. If the torque requested by the driver is greater than a threshold value, the process continues a block 104.

At 104, an optional step is shown. In this optional step, the method determines whether the torque requested by the driver is less than an upper limit value. More particularly, if a very high level of vehicle acceleration or torque is requested by the driver, such as a wide open throttle condition, the method does not need to be implemented since the very high torque demand makes it unlikely that gear backlash could occur until after the engine is started. The upper limit value may be based on vehicle calibration testing and the design attributes of the power transfer unit. If the torque requested by the driver is less than an upper limit value, the process continues a block 106.

At 106, a timer is started. The timer is used to determine how long to maintain the current gear ratio of the power transfer unit and may exceed the amount of time needed to start the engine.

At 108, gear ratio shifts of the power transfer unit are inhibited (i.e., the current gear ratio is maintained).

At 110, the method determines an additional amount of torque that would be provided if the power transfer unit were permitted to the downshift to a target gear ratio. The target gear ratio is the gear ratio that would be engaged if a gear ratio shift were permitted. The additional amount of torque may be determined as a function of the following expression:

$$(GR_{Target} - GR_{Current}) * Torque_{Demand}$$

where:

$GR_{Target}$ is the target gear ratio, $GR_{Current}$ is the current gear ratio of the power transfer unit, and $Torque_{Demand}$ is the level of torque demanded by the vehicle operator.

At 112, the method provides the additional amount of torque to the power transfer unit to improve acceleration responsiveness. The additional torque may be provided using the starter-alternator and the second power source.

At 114, the method determines whether a predetermined amount of time has elapsed. More specifically, the elapsed time measured by the timer is compared to a predetermined time value. The predetermined time value is indicative of the amount of time needed to start the engine and may be determined by vehicle testing. For example, the predetermined value is less than or equal to three seconds. If the predetermined amount of time has not elapsed, the method returns to block 108. If the predetermined amount of time has elapsed, the method ends at block 116 where gear ratio shifts are enabled.

Figure 3:
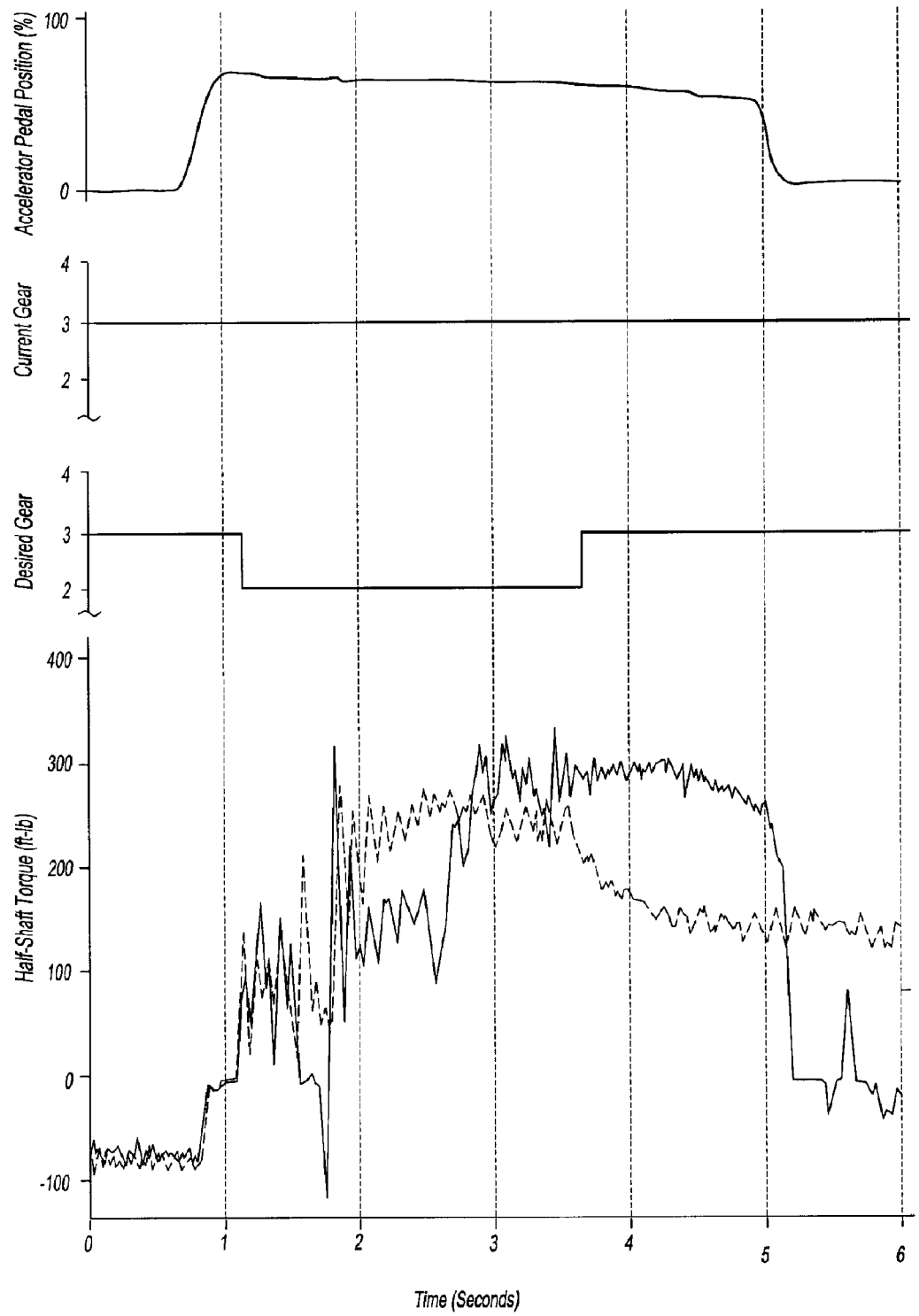
FIG. 3 is a plot depicting the operation of the hybrid electric vehicle in accordance with the method of FIG. 2.

Referring to FIG. 3, a plot depicting the operation of the hybrid electric vehicle in accordance with the method of FIG. 2 is shown. The plot depicts the change of various vehicle parameters over time. More particularly, from top to bottom, the plot depicts the accelerator pedal position, current gear ratio of the power transfer unit, the desired or target gear ratio, and the axle or halfshaft torque.

The vertical axes differ for each vehicle parameter depicted in the plot. The accelerator pedal position is shown as a percentage. 100% designates a fully actuated accelerator pedal or wide open throttle condition. 0% designates a fully released accelerator pedal (i.e., the accelerator pedal is not pressed). The current and desired gear ratios are expressed as integers (e.g., "4" designates fourth gear, "3" designates third gear, etc.).

Referring to the halfshaft torque plot, two lines are shown. The solid line represents the halfshaft torque without the control method of the present invention. The dotted line represents the halfshaft torque when the method of the present invention is employed.

In the absence of the control method of the present invention, the halfshaft torque (solid line) shifts from negative to positive at approximately 1.75 seconds and between positive and negative values between 5 and 6 seconds. This shifting is indicative of gear backlash in the drivetrain, such as in the differential or power transfer unit. More particularly, when the present invention is not employed, an fast engine start is requested to quickly respond to the driver's request for acceleration. The fast engine start results in a negative to positive torque shift at approximately 1.75 seconds. In addition, the driver's acceleration request would normally result in a downshift from third gear to second gear between approximately 2.75 and 3.0 seconds. Such a gear ratio shift results in shifts between positive and negative torque values between 5 and 6 seconds.

In contrast, the halfshaft torque measured when the control method of the present invention is employed (dotted line) does not shift between positive and negative values. As such, gear backlash is inhibited.

The operation of the method in accordance with the present invention will now be described in more detail. At time 0 (t=0) the engine is turned off and the hybrid electric vehicle is in motion, such as may occur when the vehicle is coasting or being powered by a secondary power source. The halfshaft torque is a negative value (indicative of regenerative braking).

At approximately 0.75 seconds, the driver presses the accelerator pedal approximately 60% as shown in the accelerator pedal position plot. The control unit interprets the change in the accelerator pedal position as a request for a high level of acceleration or wheel torque. In response, the control unit requests that the engine be started. The control unit also compares the requested level of torque to the threshold value. In this scenario, the threshold level is exceeded, resulting in the execution of blocks 106 through 114 of the method in FIG. 2. Consequently, the timer is started and gear ratio shifts are inhibited for a predetermined period of time. In this scenario, the predetermined period of time is 3.0 seconds.

At approximately 1.1 seconds, the control unit determines a downshift to a lower gear ratio (from third gear to second gear) is desirable to provide the requested level of torque. However, the gear ratio shift is not implemented and the power transfer unit remains in third gear as indicated by the current gear plot.

At approximately 3.6 seconds, the control unit determines that an upshift to a higher gear ratio (from second to third gear) would be desirable. However, such a gear shift is not implemented since the power transfer unit is already in third gear.

At approximately 3.75 seconds, the predetermined period of time has elapsed and the strategy is discontinued.

While the best mode for carrying out the invention has been described in detail, those familiar with the art to which this invention relates will recognize various alternative designs and embodiments for practicing the invention as defined by the following claims.

What is claimed is:

1. A method for controlling a wheel drive system of a hybrid electric vehicle when starting a power source, the hybrid electric vehicle having first and second power sources, a motor configured to be driven by the first and/or second power sources, and a power transfer unit having a plurality of gear ratios, the power transfer unit configured to be driven by the motor to drive a vehicle wheel, the method comprising:

determining whether the first power source is to be started;

determining whether a level of torque requested by a vehicle operator is greater than a threshold value if the first power source is to be started and the hybrid electric vehicle is in motion;

maintaining a current gear ratio if the level of torque requested by the vehicle operator is greater than the threshold value; and providing a target level of torque with the motor while the current gear ratio is engaged.

2. The method of claim 1 wherein the step of determining whether the level of torque requested by the vehicle operator is greater than the threshold value further comprises determining whether the level of torque requested by the vehicle operator is less than an upper limit value.

3. The method of claim 1 wherein the current gear ratio is maintained for a predetermined period of time.

4. The method of claim 1 wherein the first power source is an internal combustion engine selectively coupled to the motor via a clutch.

5. The method of claim 1 wherein the second power source is a battery.

6. The method of claim 1 wherein the level of torque requested by the vehicle operator is based on a signal from an accelerator pedal position sensor.

7. The method of claim 1 wherein the threshold value is based on the current gear ratio of the power transfer unit.

8. The method of claim 1 wherein the step of determining the target level of torque based on the current gear ratio and the level of torque demanded by the vehicle operator.

9. A method for controlling a wheel drive system of a hybrid electric vehicle during a rolling start, the hybrid electric vehicle having first and second power sources, a motor adapted to be powered by at least one of the power sources, and a power transfer unit having a plurality of gear ratios, the power transfer unit being adapted to be driven by the motor to drive a vehicle wheel, the method comprising:

determining whether to start the first power source;

determining whether a level of torque requested by a vehicle operator is greater than a threshold value indicative of a level at which a power transfer unit gear ratio downshift would be desired;

inhibiting a downshift to a lower gear ratio for a predetermined period of time; and providing an additional amount of torque to the vehicle wheel with the motor and second power source while the downshift to the lower gear ratio is inhibited.

10. The method of claim 9 wherein the step of providing an additional amount of torque includes determining an amount of torque that would be available if the target gear ratio were engaged.

11. The method of claim 10 wherein the additional amount of torque is equal to the amount of torque that would be available if the target gear ratio were selected.

12. The method of claim 9 wherein the motor is a starter-alternator.

13. The method of claim 9 wherein the predetermined period of time is less than or equal to 3 seconds.

14. The method of claim 9 wherein the level of torque requested by the vehicle operator is based on a signal from an accelerator pedal position sensor.

15. A method for controlling a wheel drive system of a hybrid electric vehicle during an engine start, the hybrid electric vehicle comprising an engine, a voltage source, a power transfer unit adapted to drive a vehicle wheel and having a plurality of gear ratios, a motor-generator selectively coupled to the engine via a first clutch, selectively coupled to the power transfer unit via a second clutch, and adapted to be powered by at least one power sources, the method comprising:

determining whether an engine start-up is requested while the hybrid electric vehicle is moving;

determining whether a level of torque requested by a vehicle operator exceeds a threshold value associated with a current gear ratio;

starting a timer;

inhibiting a gear ratio shift of the power transfer unit;

starting the engine;

calculating an amount of torque to provide to the power transfer unit while in the current gear ratio;

providing the amount of torque to the power transfer unit with the motor-generator while the engine is being started; and repeating the inhibiting, calculating, and providing steps until a predetermined period of time measured by the timer has elapsed.

16. The method of claim 15 wherein the step of determining whether the level of torque requested by the vehicle operator exceeds the threshold value further comprises permitting a shift from the current gear ratio to a target gear ratio if the level of torque requested exceeds a limit value indicative of a wide open throttle condition.

17. The method of claim 15 wherein the step of calculating the amount of torque to provide to the power transfer unit is based on the current gear ratio, a target gear ratio that would be engaged if a gear ratio shift were permitted, and the level of torque requested by the vehicle operator.

18. The method of claim 15 wherein the level of torque requested by a vehicle operator is based on a signal from an accelerator pedal position sensor.

19. The method of claim 15 further comprising engaging the first clutch while the engine is being started.

20. The method of claim 15 further comprising engaging the second clutch after the engine has started.

* * * * *